Patented Aug. 5, 1941

2,251,474

UNITED STATES PATENT OFFICE 2,251,474

METHOD OF RECOVERING SELECTIVE SOLVENTS

Hendrikus van der Waerden, The Hague, Netherlands, assignor to Shell Development Company, San Francisco, Calif., a corporation of Delaware No Drawing. Application July 26, 1935, Serial No. 33,315. In the Netherlands August 2, 1934

1 Claim. (Cl 196—13)

This invention relates to the art of extracting hydrocarbon mixtures with selective solvents for separating them into portions which are, respectively, relatively more paraffinic and more aromatic and/or naphthenic, and is particularly concerned with an improved method for removing the selective solvent from the hydrocarbons in the liquid phases produced in the extraction process.

In the extraction of hydrocarbon oils relatively high-boiling selective liquids are often employed as the selective solvent. The quantitative recovery of the solvent from the hydrocarbons is necessitated by the cost of these solvents and/or by the requirement of producing hydrocarbon products which are entirely free from the selective solvent. To accomplish this separation by distillation is, however, often not practical because of the formation of decomposition, polymerization, or reaction products of the hydrocarbons and the selective solvent. These undesirable reaction products often have an adverse influence upon the color and/or other characteristics of the hydrocarbon products, and are generally very difficult to separate therefrom. Moreover, the formation of these undesirable products entails a loss of the solvent. As an example may be mentioned the removal of furfurol, or cresol, or nitrobenzene, etc., from a lubricating oil raffinate. This is generally attended with decolorization and polymerization.

If such separations are to be effected by distillation, not only is it necessary to employ a high vacuum in the distillation column, but it is also necessary to control the conditions in the column with great care to avoid overheating and to prevent the exposure of the solvent to the elevated temperatures for too long a time. In many cases even the use of a high vacuum will not entirely prevent the deterioration of the products, and it becomes necessary to subject the hydrocarbons to further refining treatments. This is especially true of the raffinates produced in the extraction of lubricating oils.

It has been proposed to avoid the necessity of distillation by washing the oil-solvent mixture with a light naphtha. Since, however, the naphtha is ineffective to remove all of the selective solvent, it was often necessary to follow this washing with a further treatment of the oil with a chemical which would react with the solvent and remove the last traces thereof.

In accordance with the present invention I have found that the selective solvent can be effectively removed from the oil by washing the oil-solvent mixture with an extracting agent which is a volatile polar liquid and is capable of dissolving the high boiling selective solvent in preference to the hydrocarbons. In other words, the extracting agent must be more miscible with the selective solvent than with the oil, and must be capable of forming two liquid layers when mixed with the hydrocarbon-solvent mixture. The volatile extracting agent can then be removed from the hydrocarbons and from the selective solvent by separately distilling the phases from the washing treatment at a low temperature, and both the selective solvent and the extracting agent may be recycled to treat further quantities of oil.

I have found liquid sulfur dioxide to be especially useful as an extracting agent for this purpose. Other volatile or low boiling polar liquids, particularly furfurane, acetone, acetaldehyde, and formaldehyde may also be employed. They should, preferably, have boiling points below 60° C.

Such volatile polar liquids may be used with any high boiling selective solvents. Among such high-boiling solvents may be particularly mentioned: cresols, phenols, furfural, (furfuraldehyde), nitro-benzene, $\beta\beta'$ dichloroethyl ether ("Chlorex") and aniline.

The quantity of extracting agent to be employed in a given situation depends upon the mutual solubility of the three components (hydrocarbons, high-boiling selective solvent, and low-boiling extracting agent) at the temperature employed. The treatment with the low boiling extracting agent should, preferably, but not necessarily, be according to the countercurrent mode of operation. It may be carried out in any suitable liquid contact apparatus, such as a packed column, or a single- or multi-stage countercurrent treater, of the type commonly employed in extraction processes. This washing of the oil-solvent solution may be conducted according to the methods employed in the extraction of liquid mixtures with selective solvents, and may employ such improvements thereon as a temperature gradient, as described in the Netherlands Patent 27,077; and/or a backwash, as described in the Netherlands Patent 33,941.

It is, moreover, often desirable to wash the solution of selective solvent and extracting agent with a light paraffinic hydrocarbon, such as propane, butane, pentane, or with light naphtha, having a boiling temperature different from that of the hydrocarbon mixture being extracted. This washing is effective in removing the last traces of hydrocarbons from the selective solvent-extracting agent mixture. It should be noted, however, that this expedient is not at all essential because the selective solvent and extracting agent are normally returned to the process, and any hydrocarbons contained therein would be returned with them.

In order to describe my invention more fully, the following example is set forth:

A lubricating oil raffinate phase which was obtained by extracting a Venezuelan raw petroleum fraction with furfural, and which contained 8% furfural, was completely freed from furfural by a single washing in a batch treatment with 33% by volume (based on the raffinate phase) of liquid sulfur dioxide. The use of a countercurrent method of contact would permit the complete removal of the furfural with a substantially smaller quantity of sulfur dioxide. The same result was obtained when washing a similar raffinate containing cresol instead of furfural.

The low boiling sulfur dioxide was readily removed from the oil raffinate and from the furfural by distillation at a low temperature.

The oil raffinate, after the distillation to remove the sulfur dioxide, had a much lighter color than that obtained by distilling off the furfural from the oil raffinate. Consequently, no second refining of the raffinate was required for this product, whereas a raffinate produced by distilling the furfural from another portion of the above raffinate phase had an undesirable color and had to be subjected to further refining.

It should be noted that although I have described the application of my invention to the production of a lubricating oil raffinate, it is not restricted thereto, but may be employed as well to the recovery of the solvent from the extract phase, without departing from the scope of my invention. My invention may also be applied to the recovery of high boiling selective solvent from hydrocarbons which boil below the boiling temperature ranges of lubricating oils.

As used in the present specification and claims, the term "high boiling selective solvent" is intended to include all selective solvents which, at normal pressure, boil at temperatures at which decomposition, and/or polymerization, and/or reaction with the hydrocarbons occurs, as well as those which boil at temperatures substantially above 150° C., and more, therefore, difficult to separate from hydrocarbons without the employment of vacuum and/or steam distillation methods, although usually no undesirable products would be formed in such distillations. My invention is not, therefore, to be limited to the recovery of the specific selective solvents heretofore recited, nor to the use of the specific extracting agents disclosed, but is to be construed as covering broadly the recovery of any high boiling selective solvent from hydrocarbon mixtures.

I claim as my invention:

The process of producing a lubricating oil which comprises the steps of extracting a petroleum lubricating oil with furfural to produce liquid raffinate and extract phases separating said phases, contacting said raffinate phase with liquid sulfur dioxide to produce two second liquid phases one of which is rich in oil and substantially completely free from furfural, the other consisting predominantly of furfural and sulfur dioxide, separating the said second phases, and separately removing the liquid sulfur dioxide from the former second phase by distillation.

HENDRIKUS VAN DER WAERDEN.